Oct. 9, 1928.
R. H. GOODMAN
CULTIVATOR
Original Filed June 15, 1925
1,687,200
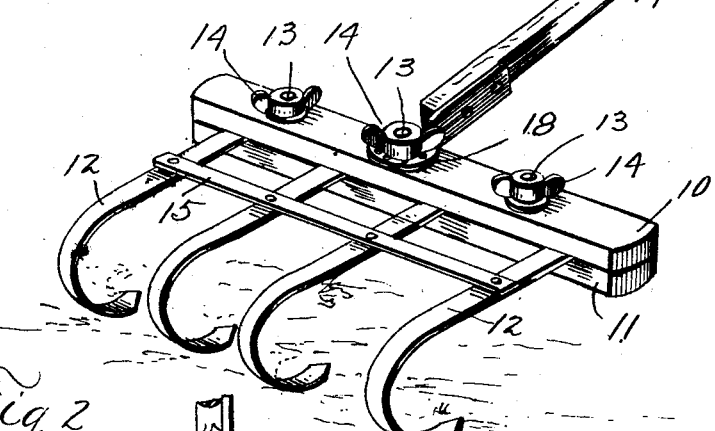
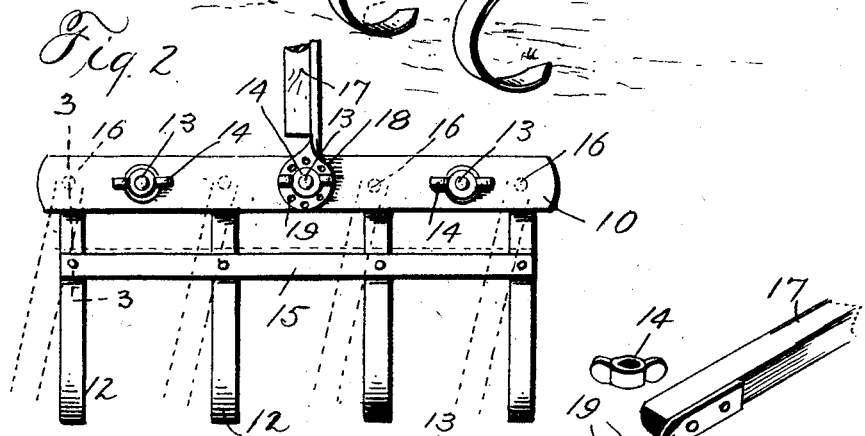
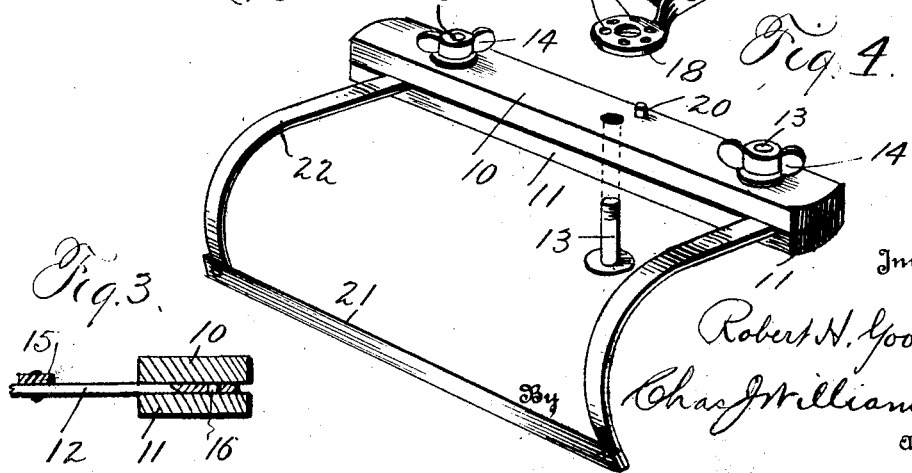
Inventor
Robert H. Goodman
By Chas. J. Williamson
Attorney Patented Oct. 9, 1928.

1,687,200

UNITED STATES PATENT OFFICE.

ROBERT HARRISON GOODMAN, OF ROMANCE, ARKANSAS.

CULTIVATOR.

Application filed June 15, 1925, Serial No. 37,327. Renewed August 24, 1928.

My invention relates to agricultural implements and in particular to a hand-tool used as a cultivator, or hoe, or scraper, my object being to provide such a tool that will be light, strong and with adjustable and interchangeable members, to adapt the implement to varying uses and different conditions of use.

My invention consists in whatever is described by or is included within the terms or scope of the appended claim.

In the annexed drawings:

Fig. 1 is a perspective view of my implement arranged as a cultivator;

Fig. 2 is a top plan view thereof, showing in full and dotted lines different positions of the cultivator teeth;

Fig. 3 is a section on the line 3—3 of Fig. 2;

Fig. 4 is a perspective view showing the implement with a scraper substituted for the cultivator teeth.

Referring to what is shown in Figs. 1 to 3, it will be seen that my implement comprises a beam that consists of two bars, 10 and 11, placed one above the other, in a space between which the shanks, 12, of the cultivator teeth are pivoted, so that the cultivator teeth may be shifted to different angles, and by clamping-bolts, 13, and a thumb-nut, 14, for each bolt which passes through holes in the bars, the cultivator teeth may be securely clamped in whatever position the teeth may be placed. Just in the rear of the beam the shanks of the cultivator teeth are pivotally connected to a tie-bar, 15, which ties the cultivator teeth together and maintains them spaced parallel with one another, regardless of the angle at which they are adjusted. Each cultivator tooth-shank is pivotally connected with the beam as by means of a lug, 16, that projects from one of the beam-bars, and engages a hole in the shank. Each cultivator tooth is thus individually attached to the beam, and as the tie-bar joins all of the teeth it will be seen that the construction is a strong one, and able to withstand whatever hard usage the implement may be subjected to in use.

For draft purposes, a handle, 17, is attached at midlength of the beam, by means of a circular plate or disc, 18, of metal, which is mounted upon the middle clamping-bolt, which constitutes a pivotal connection for the handle, upon which it may be turned to change the angle at which it stands with reference to the beam. To securely hold the handle in any one of a number of adjustable positions, the plate, 18, has a circular series of holes, 19, any one of which may engage a pin or stud, 20, on the upper side of the beam. The plate is clamped in position by the thumb-nut applied to the bolt.

Referring to Fig. 4, it will be seen how readily my implement can be converted into a cultivator, from a scraper, for example. The cultivator teeth are removed from the beam, and the scraper substituted therefor, which comprises a blade, 21, and curved arms, 22, at its opposite ends, which are inserted between the clamping-bars of the beam, and engaged with the studs or lugs, 16, near the end thereof.

What I claim is:

An agricultural implement comprising a beam composed wholly of two bars substantially alike, one above the other, bolts passing vertically through said bars at different points along the length thereof, one being at midlength, and separably clamping the two bars together, ground-working members having shanks that extend between said bars and having holes in the portions lying between the bars, projections on one of said bars extending into said holes, and a rotatably adjustable handle mounted upon the bolt at midlength of the beam.

In testimony whereof I hereunto affix my signature.

ROBERT HARRISON GOODMAN.